United States Patent

[11] 3,615,284

| [72] | Inventor | Richard D. Cassar<br>West Chester, Pa. |
|---|---|---|
| [21] | Appl. No. | 840,532 |
| [22] | Filed | July 9, 1969 |
| [45] | Patented | Oct. 26, 1971 |
| [73] | Assignee | Sun Oil Company<br>Philadelphia, Pa. |

[54] FUEL COMPOSITION
4 Claims, No Drawings

[52] U.S. Cl. .................................................. 44/1 R
[51] Int. Cl. .................................................. C10l
[50] Field of Search .......................................... 44/1, 6, 16, 24, 21, 25, 26, 41; 126/59.5

[56] References Cited
UNITED STATES PATENTS

| 2,831,330 | 4/1958 | Walker | 44/7.5 X |
|---|---|---|---|
| 3,091,952 | 6/1963 | Black | 44/7.5 X |
| 3,208,520 | 9/1965 | Gilchrist | 44/6 X |
| 3,232,720 | 2/1966 | Kepple | 44/6 X |
| 3,327,505 | 6/1967 | Brown | 431/288 |

*Primary Examiner*—Daniel E. Wyman
*Assistant Examiner*—C. F. Dees
*Attorneys*—George L. Church, Donald R. Johnson and Wilmer E. McCorquodale, Jr.

ABSTRACT: An improved solid fuel composition comprises 65 to 98.8 weight percent paraffin wax, 1.1 to 25 weight percent of ultrahigh molecular weight polyethylene, and 0.1 to 10 weight percent of palygorskite particles, the latter two uniformly distributed throughout the wax, is useful for supplying heat to protect living plants susceptible to injury low ambient air temperature. The ultrahigh molecular weight polyethylene refers to a polyethylene with a weight average molecular weight in the range of 500,000 to 6,000,000. The clay particles in this composition have the function of keeping the polyethylene uniformly distributed throughout the composition. In addition the particles reduce dripping during combustion and reduce the amount of unburnt hydrocarbon residue.

FUEL COMPOSITION

CROSS-REFERENCE TO RELATED APPLICATIONS

This invention is related to that described and claimed in Duling and Cassar application Ser. No. 840,530, filed the same date as this application, and constitutes an improvement in the solid fuel composition disclosed in the Duling and Cassar application. This invention is also related to that described and claimed in Cassar application Ser. No. 840,531, filed of even date herewith, and issued as U.S. Pat. No. 3,560,122 which describes a novel candlewick using the composition defined in this application.

BACKGROUND OF THE INVENTION

This invention relates to improved solid fuel formulation, that is, when shaped into a large containerless mass, self-supporting in hot weather, easily ignitable and during combustion is dripless despite the lack of a container, smokeless, and gives off heat at a uniform rate and after combustion leaves almost no hydrocarbon residue. The invention also embraces the method of protecting living plants from low temperatures by burning the solid material defined herein and the solid body capable of sustaining combustion having the composition defined herein. The improved solid fuel composition comprises 65 to 98.8 weight percent paraffin wax, 0.1 to 10 weigh percent of palygorskite particles and 1.1 to 25 weight percent of ultra high molecular weight polyethylene, the latter two uniformly distributed throughout the wax. The polyethylene with a molecular weight in the range of 500,000 to 6,000,000 is also referred to herein for convenience as "UHMW PE." The clay particles used must be capable of passing through a 32-mesh Tyler screen.

Protection of living plants against freezing temperatures and resultant frost damage is of paramount importance to fruit growers, vegetable farmers, and ornamental nurserymen. Freezing temperatures can occur at any time depending upon the area as a result of a generalized cold snap or of localized conditions where cold and warm air layers stratify. Frost damage to fruit trees can destroy the trees, blooms or maturing fruit. Likewise, vegetable crops can be destroyed at any time as well as ornamental flowers, shrubs and trees.

Various means have been used to combat frost damage when falling temperatures threaten. The most widespread method has been to burn solid and liquid combustible materials in the locus of the living plants to warm the ambient air. It is well known that incomplete combustion of such materials can cause plant damage as well as create serious air pollution problems and road hazards by the smoke produced. For example, S. G. Belak, R. H. Campbell, W. R. Cherry and A. J. Bozzelli U.S. Pat. No. 3,362,800, dated Jan. 9, 1968, describes a solid bituminous fuel composition which, although readily combustible when ignited with a gasoline torch, produces some black smoke. In addition the high cost of solid fuel units has prevented the commercialization of many of the fuel compositions already patented. A major factor contributing to this high cost is the cost of the container. For example a cost analysis of the solid fuel unit described in U.S. Pat. No. 3,327,505, J. S. Brown, dated June 27, 1967, indicates that the cost of the polyolefin-coated paper container exceeds the cost of the wax fuel but yet very little heat is obtained from the paper container. Liquid fuels require a substantial capital investment in mechanical burners, storage and delivery equipment that is costly to maintain and operate.

Another problem can arise where the fuel is in a cardboard container. In many areas such fuel units are stored unprotected in open fields thereby being exposed to rain and sun. If the protective covering of the cardboard is damaged moisture enters into the cardboard and quickly reduces the effectiveness of the cardboard container.

Consequently, a containerless solid fuel that burns uniformly without smoke and is easily handled and can be stored in the field ready for use is desired to replace solid materials such as smoky bituminous fuels and the costly liquid fuels such as furnace oils.

SUMMARY OF THE INVENTION

The present invention is a solid fuel formulation of 65 to 98.8 weight percent paraffin wax, 0.1 to 10 weight percent of palygorskite particles and 1.1 to 25 weight percent of polyethylene with a weight average molecular weight in the range of 500,000 to 6,000,000. The particles and polyethylene are uniformly distributed throughout the wax. The particles used must be capable of passing through a 32-mesh Tyler screen. These particles have the function of keeping the polyethylene uniformly distributed throughout the composition. This uniform distribution of the polyethylene in turn insures that a uniform rate of heat is produced throughout combustion. In addition, the particles reduce dripping during combustion and the amount of unburnt hydrocarbon residue.

DESCRIPTION

Paraffin waxes are available with a wide range of physical properties, for example, melting points may be as low as 100° F. (AMP) or as high as 160° F. (AMP). These waxes can be used in this invention. Waxes which are commercially available and would be more generally used are those having a melting point between 127° F. (AMP) and 156°F. (AMP). Other physical properties of these latter waxes are: a penetration at 77° F. of from 9 to 33 (ASTM D-1321), SUS viscosity at 210° F. of from 37.2 to 44.8 (ASTM D-446), and oil content of from 0.2 to 3.0 (ASTM D-721). AMP refers to the American Melting Point which is an arbitrary figure 3° F. higher than the ASTM melting point.

Polyethylenes are available with a wide range of molecular weights. These molecular weights have a substantial effect on the properties of the polyethylene. For example of polyethylene with a molecular weight of 1500 is a waxy solid while a polyethylene with a molecular weight of 1,500,000 is a hard, extremely tough solid. As discussed herein molecular weight refers to weight average molecular weight determined by light scattering or solution viscosity or melt viscosity.

In the synthesis of polyethylene, not all the molecules grow to the same size. The actual size variation depends upon the polymerization employed. Consequently, while the molecular weight of the UHMW PE referred to in the examples herein is stated as being 1,500,000, there are in fact individual molecules in the UHMW PE with molecular weights lower than 1,500,000 and even lower than 1,000,000. Sometimes, the individual molecules have molecular weights as low as 500,000. Also in the same 1,500,000 weight average molecular weight polyethylene there are in fact individual molecules with molecular weights greater than 2,000,000 sometimes the individual molecules have molecular weights as high as 3,000,000 or even as high as 6,000,000. Thus the polyethylene used in this invention can have a weight average molecular weight in the range of 500,000 to 6,000,000.

The addition of a UHMW PE to the paraffin wax permits the manufacture of a containerless fuel unit that can be easily ignited despite its size. In addition this fuel unit burns without smoke thereby avoiding any pollution problem. Furthermore, if the flame is extinguished before all the unit is consumed the unit ignites easily a second or third time, etc. By a solid fuel unit being easily ignited it is meant that one safety match, in a windless environments, will ignite the fuel unit. This ease of ignition is critical when thousands of fuel units, distributed over hundreds of acres, have to be ignited in a very short time.

The addition and uniform distribution therein of more than 1.0 weight percent (of the total weight) of UHMW PE to the wax permits the formed fuel unit to be easily ignited with a safety match. However, as the percent of UHMW PE admixed with the paraffin wax is increased the ignition characteristics of the combination approaches that of only UHMW PE, which is difficult if not sometimes impossible to ignite with a match. Therefore it is desirable that the amount of UHMW PE admixed with the wax be more than 1.0 weight percent but be less than 50 weight percent and it is distinctly preferable that the amount of UHMW PE admixed with the wax be from 1.1 weight percent to 25 weight percent.

Surprisingly the addition of palygorskite particles to the combination of UHMW PE and paraffin wax insures that the UHMW PE is uniformly distributed throughout the composition. This uniform distribution of UHMW PE is important since, if there is a variation in the distribution of the UHMW PE in the wax, the rate of heat varies during combustion. This nonuniform rate of heat can be detrimental when the fuel units defined herein are being used to protect plants during a cold snap. If the heat output of several fuel units decrease at the same time localized plant damage can result. Furthermore, the particles reduce dripping during combustion. Dripping is the obvious formation of molten material which flows over the periphery of the fuel unit and which solidifies slowly as it falls down the side of the fuel unit. This dripping results in unconsumed material thereby decreasing the amount of heat obtained from a given unit. In addition the particles reduce the amount of unburnt hydrocarbon residue after combustion. Reduction in this unburnt hydrocarbon residue increases the amount of heat obtained from a given unit.

The palygorskite particles are available in a wide range of particle sized. However if the particles are too large the result is an extremely nonuniform composition. Thus a relatively smaller size must be used. While particles passing through a 32-mesh Tyler screen can be used it is preferred that the particles used are able to pass through a 60-mesh Tyler screen. Specific examples of palygorskite are attapulgite and sepiolite. These minerals are defined in Kirk and Othmer, ENCYCLOPEDIA OF CHEMICAL TECHNOLOGY, Second Edition, Vol 5, "Clays."

The amount of palygorskite particles used in the formulation can vary depending on the particular type of particle and the average particle size and the particle size distribution. In the examples used for illustrative purposes 5 percent by weight of attapulgite was used. Generally the amount of particles in the combination will range from 0.1 to 10 percent by weight of the total weight.

The advantage of using the particles defined herein becomes apparent when forming a large mess of paraffin wax and UHMW PE. For example a 27-pound cylinder of just the two hydrocarbon components is made. It is ignited. However, during combustion the heat output varies. In addition dripping occurs. The variation in heat output and the occurrence of dripping is believed to be caused by a nonuniform distribution of UHMW PE throughout the wax. The long needlelike structure of attapulgite is believed to contribute in some fashion to the uniform distribution of the UHMW PE throughout the wax particularly during the solidification of the molten composition defined herein.

In order to obtain a fuel unit which burns at a more constant rate and is dripless during combustion the UHMW PE and particles must be uniformly distributed throughout the wax. One way of achieving this uniform distribution is to add the UHMW PE as a powder and the particles, either together or separately in any sequence, to agitated molten wax, maintained at a temperature below the melting point of he UHMW PE and then allow the combination to solidify while being agitated. A preferred way of achieving this uniform distribution of additives in the wax is as follows. UHMW PE powder is added rapidly to the agitated molten wax containing the particles and maintained at a temperature above the melting point of the UHMW PE. As soon as the polyethylene gels the wax, the mass is allowed to cool without agitation.

After the combination of the wax, UHMW PE and the particles is prepared it can be formed into any shape by any one of several means. For example, a cylindrical block can be easily formed by extrusion of either the molten formulation or solid pieces of the formulation. For illustrative purposes the block used in the examples was prepared by casting. Other means of forming the block include molding or compression molding.

EXAMPLES

A typical paraffin wax, used herein for illustrative purposes, has a melting point of 127° F. (AMP), a viscosity at 210° F. of 43.6 SUS, a penetration at 77° F. of 33 (ASTM D-1321) and an oil content of 0.5 percent (ASTEM D-721). A typical UHMW PE, used herein for illustrative purposes has a weight average molecular weight of 1,500,000; a specific gravity of 0.94 (ASTM D-792), a crystalline melt point of 275° F. as determined by differential thermal analysis and a nil melt index (ASTM D-1238). The palygorskite particles used herein for illustrative purposes were attapulgite. The particles of the latter passed through a 60-mesh Tyler screen. A typical chemical analysis of attapulgite yields about 55% 2, 10.2% $Al_2O_3$, 3.5% $Fe_2O_3$, 10.5% MgO, 0.5% $K_2O$, and about 19.8% 20 removed at an elevated temperature; 99.5% total.

The compounding of the paraffin wax, UHMW PE, and clay particles was performed in the following manner. 24.3 pounds of paraffin wax was melted in a suitable container. The temperature of the molten wax was maintained at a few degrees above the melting point of the UHMW PE. 1.35 pounds of attapulgite were added to the molten wax. While the molten wax and attapulgite mixture was being agitated 1.35 pounds of UHMW PE powder were rapidly added. Soon thereafter the polyethylene gels the wax. After this gelation, the combination, without agitation, was allowed to solidify into a 27-pound cylindrical body. This cylinder was about 11 inches in diameter and about 10 inches high.

For comparative purposes 27-pound cylinders were made of (1) the heretoforementioned wax and UHMW PE, weight rations 95%/5%, (2) the heretoforementioned paraffin wax, polyethylene with a molecular weight of 100,000, and attapulgite, weight ratios 90%/5%/5%, (3) the heretoforementioned wax, UHMW PE and finely divided pyrogenic silica, weight ratios 90%/5%/5%.

These 27-pound cylinders were compared as to their ease of ignition, amount of dripping during combustion and the amount of hydrocarbon residue after complete combustion. The amounts of dripping and unburnt hydrocarbon residue were determined by visual observation. As shown in the following table only the cylinder comprising paraffin wax, UHMW PE and attapulgite performed in a satisfactory manner.

TABLE

| Composition tests | Paraffin wax containing— | | | |
| --- | --- | --- | --- | --- |
| | 5% by weight UHMW PE and— | | | 5% by wt. PE [1] and 5% by wt. attapulgite |
| | No attapulgite | 5% by wt. attapulgite | 5% by wt. $SiO_2$ | |
| 1. Can cylinder be easily ignited? | Yes | Yes | No | Yes. |
| 2. Does dripping occur? | Some | Nil | Some | Very much. |
| 3. Amount of hydrocarbon residue after complete combustion. | Very little | Practically none. | Some | Very little. |

[1] Polyethylene with molecular weight of 100,000.

The test results show that the addition of attapulgite to the paraffin wax—UHMW PE combination substantially improves the combustion performance of the fuel. Further the test results show that the replacement of the attapulgite by pyrogenic silica is not satisfactory. Lastly the results show that the addition of the particles to a paraffin wax-lower molecular weight polyethylene combination does not substantially improve the burning performance of that fuel combination.

Substantially equivalent results as in the above attapulgite example are obtained when (1) other palygorskite particles are used and/or (2) other ultra high molecular weight polyethylenes are used and/or (3) other paraffin waxes are used.

The invention claimed is:

1. A solid fuel composition comprising paraffin wax having uniformly distributed therein:
   a. an amount of polyethylene constituting between 1.1 and 25 weight percent of the composition and sufficient to facilitate ignitability, said polyethylene having a weight average molecular weight in the range of 500,000 to 6,000,000, and;
   b. an amount of palygorskite particles constituting between 0.1 to 10 weight percent of the composition and sufficient to insure uniform distribution of the polyethylene in the wax, said particles being capable of passing through a 32-mesh Tyler screen;

said composition being easily ignitable, smokeless, self-supporting and dripless.

2. A composition according to claim 1 wherein the wax has a melting point between 127° F. and 156° F. (AMP).

3. A composition according to claim 1 wherein the palygorskite is attapulgite.

4. An article of manufacture comprising a solid body having a composition according to claim 1.

* * * * *